(12) United States Patent
Altschul et al.

(10) Patent No.: US 8,504,127 B2
(45) Date of Patent: Aug. 6, 2013

(54) POCKET CASE FOR MOBILE COMMUNICATIONS DEVICES COMBINED WITH CARRYING COMPARTMENT FOR CREDIT CARD SIZED ITEMS

(76) Inventors: Matthew Timothy Altschul, Austin, TX (US); Michael Martin, Portland, OR (US); Scott Dolin, San Diego, CA (US)

( * ) Notice: Subject to any disclaimer, the term of this patent is extended or adjusted under 35 U.S.C. 154(b) by 0 days.

(21) Appl. No.: 13/357,499

(22) Filed: Jan. 24, 2012

(65) Prior Publication Data
US 2013/0095898 A1 Apr. 18, 2013

Related U.S. Application Data

(60) Provisional application No. 61/547,749, filed on Oct. 16, 2011.

(51) Int. Cl.
*H04M 1/00* (2006.01)
(52) U.S. Cl.
USPC ........................................ 455/575.8; 206/216
(58) Field of Classification Search
USPC .......................................... 455/575.1–575.8
See application file for complete search history.

(56) References Cited

U.S. PATENT DOCUMENTS

| 7,204,398 | B1 | 4/2007 | Smith, Sr. | |
|---|---|---|---|---|
| D619,356 | S | * | 7/2010 | Hillman .......................... D3/218 |
| 2008/0121322 | A1 | 5/2008 | Thomson | |
| 2010/0230301 | A1 | 9/2010 | Fellig | |
| 2011/0077061 | A1 | 3/2011 | Danze et al. | |
| 2011/0089078 | A1 | 4/2011 | Ziemba | |
| 2012/0067751 | A1 | * | 3/2012 | Mongan et al. ............... 206/216 |

FOREIGN PATENT DOCUMENTS

WO WO 0124072 A1 * 4/2001

* cited by examiner

*Primary Examiner* — Kashif Siddiqui
(74) *Attorney, Agent, or Firm* — Scheinberg & Associates; Michael O. Scheinberg; John B. Kelly

(57) ABSTRACT

A form-fitting case is comprised of two major components: 1) a structure for carrying mobile communications devices, and 2) a pocket for carrying of credit card sized devices. The pocket may be fabricated of fabric or leather. The pocket and structure are permanently adhered to create a single carrying case for both mobile communications devices such as cell phones and for items such as credit cards or paper money.

15 Claims, 2 Drawing Sheets

US 8,504,127 B2

POCKET CASE FOR MOBILE COMMUNICATIONS DEVICES COMBINED WITH CARRYING COMPARTMENT FOR CREDIT CARD SIZED ITEMS

This application claims priority from U.S. Provisional Application No. 61/547,749, filed Oct. 16, 2011, which is hereby incorporated by reference.

TECHNICAL FIELD OF THE INVENTION

The present invention relates to the field of protective covers or cases customized to fit handheld mobile communications devices such as cell phones and personal data assistants (PDAs), including while these devices are in use. The invention particularly relates to the functional features of these covers or cases to hold or carry additional items together with the mobile communications devices.

BACKGROUND OF THE INVENTION

As communications devices become more capable of handling multiple tasks, there is less of a need for people to carry as many items with them on-the-go, leading to a minimization trend. This trend is particularly apparent in the transition from simple cell phones to newer generations of cell phones integrating the calling function with e-mail, mobile apps, movie viewing, GPS navigation, calendar and clock functions, etc. In addition, the sizes and shapes of modern cell phones are much more compact than in the past, now approaching the size of other items commonly carried on-the-go, such as credit cards, driver licenses, paper money, etc.

To facilitate convenient carrying of this smaller number of items, there is a need for a single carrying device which is capable of carrying both the mobile communications devices (e.g., cellular phones) or PDAs, along with the carrying of these miscellaneous other items, such as money and credit-card sized items in a single convenient pocket case.

SUMMARY OF THE INVENTION

An object of the invention is to provide a structure by which a user may carry and operate a mobile communications device and (optionally) one or more credit card sized items in a single pocket case.

A preferred embodiment in accordance with the invention employs case configured to hold a mobile communications device, wherein the case is configured with various buttons and holes to provide access to the control buttons, jacks, lenses, and other external connections on the mobile communications device. Adhered to the case is a pocket configured to securely hold one or more credit card sized items such as credit cards, folded paper money, a driver license, etc. In a preferred embodiment, a user can operate the mobile communications device while the device is disposed within the case.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION OF PREFERRED EMBODIMENTS

Embodiments of the invention can provide one or more advantages over typical carrying cases for mobile communications devices. Some embodiments of the invention provide a pocket adhered to the case for the mobile communications device enabling convenient storage and access to one or more credit card sized items such as credit cards, folded paper money, a driver's license, etc. In a preferred embodiment, the case is an injection-molded, form-fitting case around a mobile communication device that does not add substantial bulk to the device and allows for access to all interfaces of the mobile communications device while installed. The case is comprised of two major components. First, there is an injection-molded rubber structure that form-fits the mobile communications device. Second, there is a cut-and-sewn flexible fabric leather pocket designed to fit inside a recessed area on the injection-molded case. The pocket is made with materials preferably designed to be able to adhere sturdily to the injection-molded case with an adhesive, preferably an SL Series 286 adhesive. In a preferred embodiment, the pocket allows for storage of at least one credit card sized item having length of 3.375 inches and a width of 2.125 inches.

Figure 1:
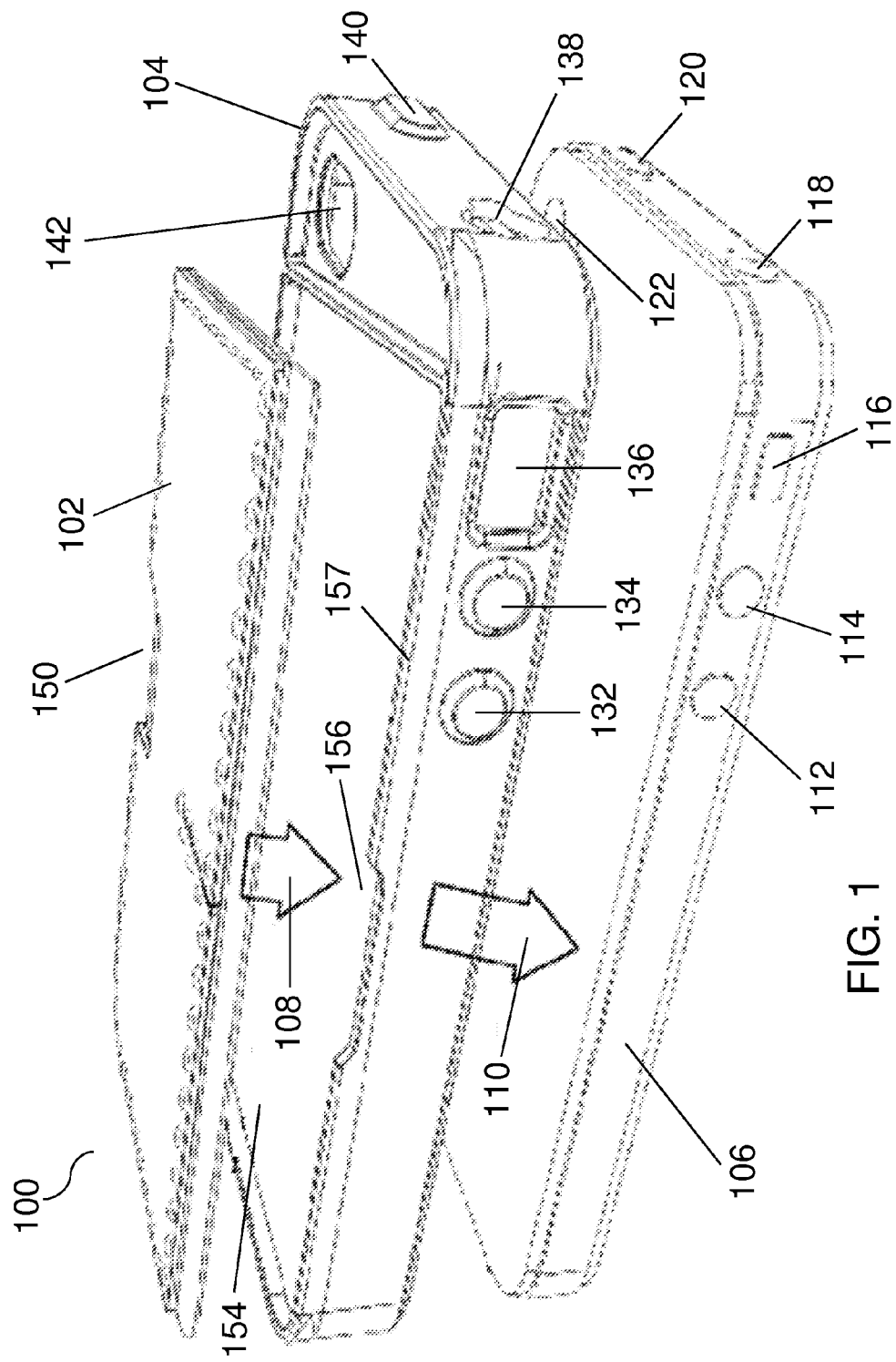
FIG. 1 is an isometric exploded view of two major components of the case with an example of a typical mobile communications device.

FIG. 1 is an isometric exploded view 100 of two major components of the case with an example of a typical mobile communications device 106. A case 104 for holding the mobile communications device 106 may typically be comprised of plastic, rubber, or silicone. The case may typically be formed by injection molding or other techniques compatible with the material used to form the case 104. A retaining wall 157 is configured to form one side of an enclosure or pocket 154 for containing credit card sized items as shown on one side of the case 104. Another side of the enclosure or pocket 154 is formed by cover 102, at least a portion of which may typically comprise leather or flexible fabric which is firmly adhered to the case 104. The adhering step is indicated by assembly arrow 108. A notch 156 in the retaining wall 157 enables easy access to the underside of credit card sized items which have previously been inserted into the pocket, thereby facilitating more easy removal of these items when needed.

Assembly of the case 104 over a typical mobile communications device 106 is indicated by assembly arrow 110. Modern mobile communications devices have a number of functions, many of which require various control buttons or connections. To enable proper operation of the mobile communications device 106 when enclosed in case 104, various access holes or buttons are required. For example, button 132 on case 104 is configured to enable pushing of button 112 on device 106. Similarly button 134 enables pushing of button 114. Access hole 136 in case 104 facilitates operation of slider switch 116 on device 106. Access hole 138 in case 104 enables access to connector 118 in device 106. Button 140 enables pushing of button 120. Access hole 142 in case 104 provides an opening for camera lens 122 in device 106. The button and access hole locations and functions described here are exemplary only, and are not part of the present invention. Each mobile communications device 106 could require a particular design of buttons and access holes in case 104 to enable proper operation of the device 106.

Figure 2:
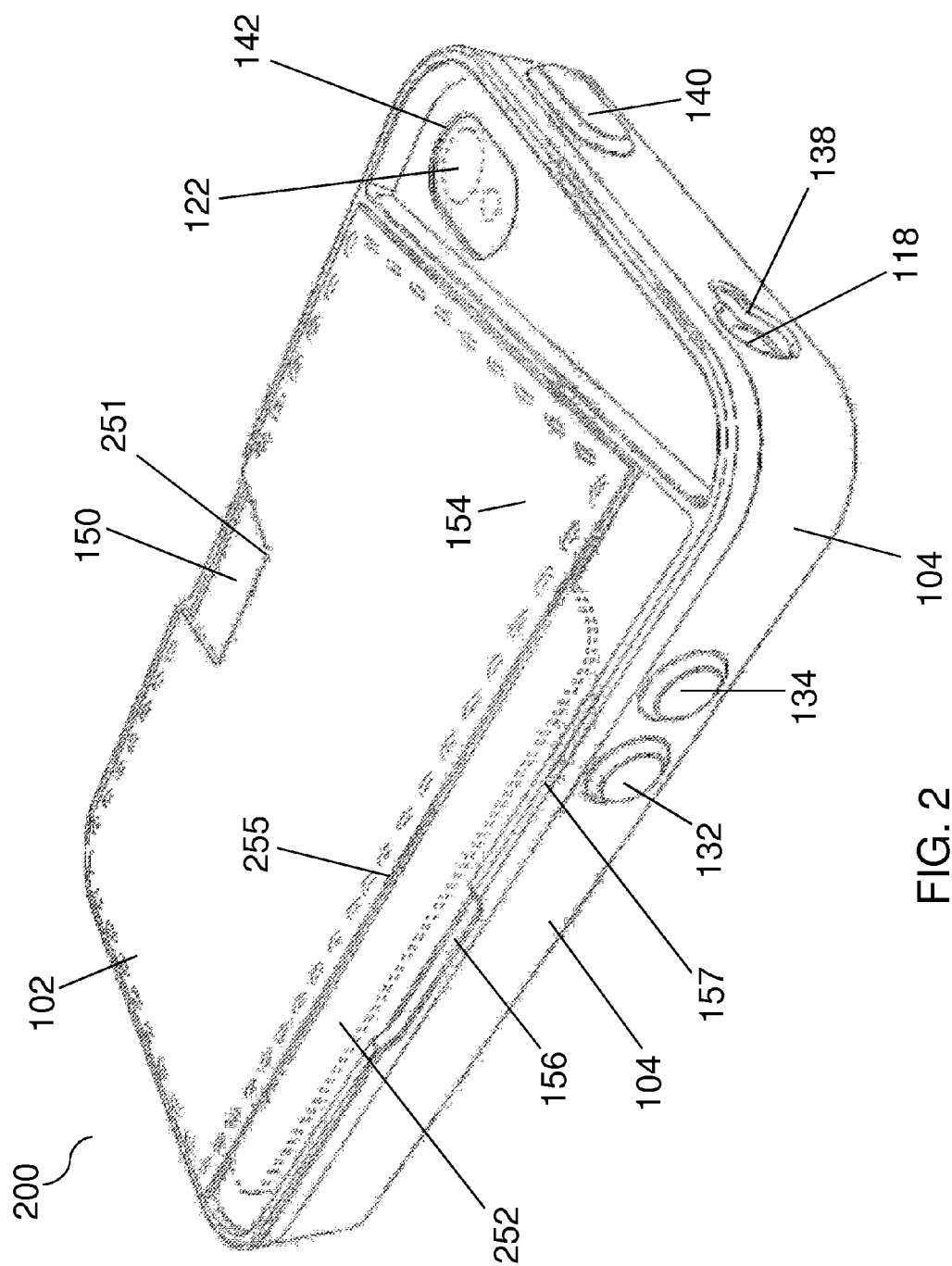
FIG. 2 is an isometric assembly view of the case containing the mobile communications device and a credit card.

FIG. 2 is an isometric assembly view 200 of the case 104 containing the mobile communications device 106 and a credit card 152 within the enclosure at the side of case 104. A credit card 252 is shown contained in the pocket 154. Cover 102 of pocket 154 has an edge 255 which is recessed to enable easy access to any credit card sized items contained within pocket 154. Notch 156 in wall 157 surrounding pocket 154 enables a user to extend a fingernail or other sharp device underneath credit card 151, for example, thereby raising it to pass over wall 157 for easy removal from pocket 154. Opening 150 with edge 251 is configured to enable easy access to the other side of credit card 252, for example, allowing card 252 to be pushed forward past wall 157 during removal of card 252 from pocket 154.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim as follows:

1. A pocket case for a mobile communications device, the case comprising:
    a protective cover for holding the mobile communications device;
    a pocket for holding one or more credit card sized items, the pocket affixed to the protective cover;
    wherein the protective cover comprises injection-molded plastic, rubber, or silicone;
    wherein the protective cover is substantially form-fitting to the mobile communications device;
    wherein at least a portion of the pocket is comprised of a flexible fabric or leather; and
    wherein the pocket is affixed to the protective cover by an SL Series 286 adhesive.

2. The pocket case of claim 1, wherein the one or more credit card sized items have a width no greater than 2.5 inches and a length no greater than 4 inches.

3. The pocket case of claim 1, wherein the one or more credit card sized items is selected from a group comprising: a credit card, an identification card, a driver's license, a debit card, an automated teller machine card, a membership card, a gift card, a key card, an employee badge, and paper currency.

4. The pocket case of claim 1, wherein the controls of the mobile communications device can be operated with the pocket case disposed on the mobile communications device.

5. The pocket case of claim 1, wherein the case substantially does not cover a touchscreen of the mobile communications device.

6. A handheld mobile communications system comprising:
    a mobile communications device;
    a protective cover substantially form-fit to the mobile communications device;
    a pocket affixed to the protective cover;
    wherein the protective cover comprises injection-molded plastic, rubber, or silicone;
    wherein the protective cover is substantially form-fitting to the mobile communications device;
    wherein at least a portion of the pocket is comprised of a flexible fabric or leather; and
    wherein the pocket is affixed to the protective cover by an SL Series 286 adhesive.

7. The system of claim 6, wherein the one or more credit card sized items have a width no greater than 2.5 inches and a length no greater than 4 inches.

8. The system of claim 6, wherein the one or more credit card sized items is selected from a group comprising: a credit card, an identification card, a driver's license, a debit card, an automated teller machine card, a membership card, a gift card, a key card, an employee badge, and paper currency.

9. The system of claim 6, wherein the controls of the mobile communications device can be operated with the protective cover and pocket disposed on the mobile communications device.

10. The system of claim 6, wherein the case substantially does not cover a touchscreen of the mobile communications device.

11. A method of manufacturing a pocket case for a mobile communications device, the method comprising:
    forming an injection-molded case having a recessed portion and an open portion, the injection-molded case substantially form-fitting a mobile communications device;
    cutting and sewing a pocket for holding one or more credit card sized items, at least a portion of the pocket comprising a flexible fabric or leather;
    affixing the pocket to a surface within the recessed portion of the injection-molded case;
    wherein the protective cover comprises injection-molded plastic, rubber, or silicone; and
    wherein the pocket is affixed to the protective cover by an SL Series 286 adhesive.

12. The method of claim 11, wherein the one or more credit card sized items have a width no greater than 2.5 inches and a length no greater than 4 inches.

13. The method of claim 11, wherein the one or more credit card sized items is selected from a group comprising: a credit card, an identification card, a driver's license, a debit card, an automated teller machine card, a membership card, a gift card, a key card, an employee badge, and paper currency.

14. The method of claim 11, wherein the controls of the mobile communications device can be operated with the pocket case disposed on the mobile communications device.

15. The method of claim 11, wherein the case substantially does not cover a touchscreen of the mobile communications device.

* * * * *